US010796892B2

(12) United States Patent
Toriumi et al.

(10) Patent No.: US 10,796,892 B2
(45) Date of Patent: Oct. 6, 2020

(54) SAMPLE MOUNTING PLATE AND METHOD FOR MANUFACTURING THE SAME

(71) Applicants: CITIZEN FINEDEVICE CO., LTD., Minamitsuru-gun, Yamanashi (JP); CITIZEN WATCH CO., LTD., Nishitokyo-shi, Tokyo (JP)

(72) Inventors: Kazuhiro Toriumi, Minamitsuru-gun (JP); Tomoki Kuratomi, Minamitsuru-gun (JP)

(73) Assignees: CITIZEN FINEDEVICE CO., LTD., Yamanashi (JP); CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/132,868

(22) Filed: Sep. 17, 2018

(65) Prior Publication Data

US 2019/0019661 A1 Jan. 17, 2019

Related U.S. Application Data

(63) Continuation of application No. PCT/JP2017/011064, filed on Mar. 17, 2017.

(30) Foreign Application Priority Data

Mar. 18, 2016 (JP) ................................ 2016-055784

(51) Int. Cl.

*G01N 1/00* (2006.01)
*H01J 49/04* (2006.01)
*H01J 49/16* (2006.01)

(52) U.S. Cl.

CPC ......... *H01J 49/0418* (2013.01); *H01J 49/164* (2013.01)

(58) Field of Classification Search

CPC ........................................................ G01N 1/00
See application file for complete search history.

(56) References Cited

U.S. PATENT DOCUMENTS

| | | | | |
|---|---|---|---|---|
| 2002/0045270 | A1 | 4/2002 | Schurenberg et al. | |
| 2004/0217276 | A1 | 11/2004 | DiCesare | |
| 2016/0141166 | A1* | 5/2016 | Toriumi | H01J 49/0418 250/288 |

FOREIGN PATENT DOCUMENTS

| | | | |
|---|---|---|---|
| JP | 2006-525525 | A | 11/2006 |
| JP | 2007-309860 | A | 11/2007 |

(Continued)

OTHER PUBLICATIONS

International Preliminary Report on Patentability dated Sep. 18, 2018, issued in counterpart International Application No. PCT/JP2017/011064. (4 pages).

(Continued)

*Primary Examiner* — Jyoti Nagpaul
(74) *Attorney, Agent, or Firm* — Westerman, Hattori, Daniels & Adrian, LLP

(57) ABSTRACT

A sample mounting plate which is used for mass spectrometry according to MALDI process and which is provided with at least one sample loading spot for mounting a sample on a substrate, wherein: a hydrophilic surface produced by a first hydrophilic film is formed within the sample loading spot on a surface of the substrate provided with the sample loading spot; a hydrophobic surface produced by a hydrophobic film is formed on the outside of the hydrophilic surface; and a boundary part, in which a hydrophilic member or a second hydrophilic film having a higher hydrophilicity than the first hydrophilic film is exposed, is formed at the boundary between the hydrophilic surface and the hydrophobic surface.

11 Claims, 6 Drawing Sheets

(56) References Cited

FOREIGN PATENT DOCUMENTS

| | | | |
|---|---|---|---|
| JP | 2015-197305 | A | 11/2015 |
| JP | 2016-121968 | A | 7/2016 |
| JP | 2016-145746 | A | 8/2016 |
| WO | 2004/100208 | A1 | 11/2004 |
| WO | 2015/019861 | A1 | 2/2015 |

OTHER PUBLICATIONS

Extended European Search Report dated Oct. 15, 2019, issued in counterpart EP Application No. 17766873.8. (10 pages).

* cited by examiner

{Fig. 1}
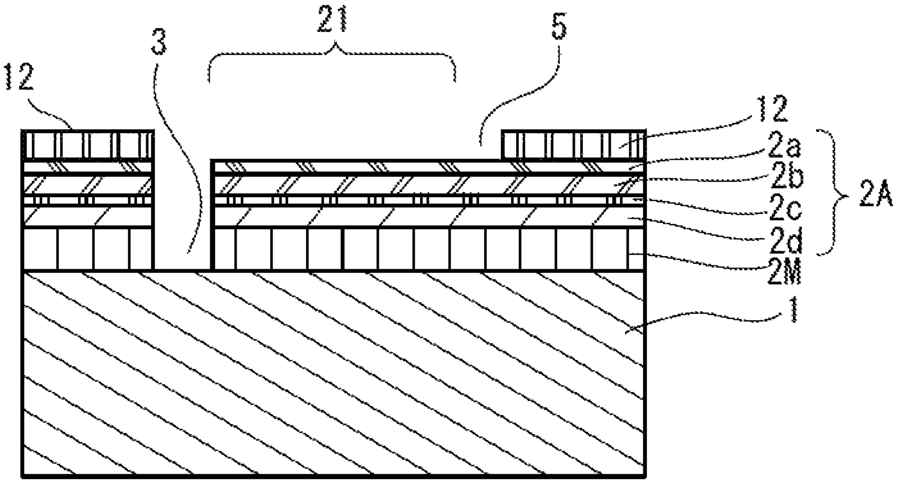
{Fig. 2}
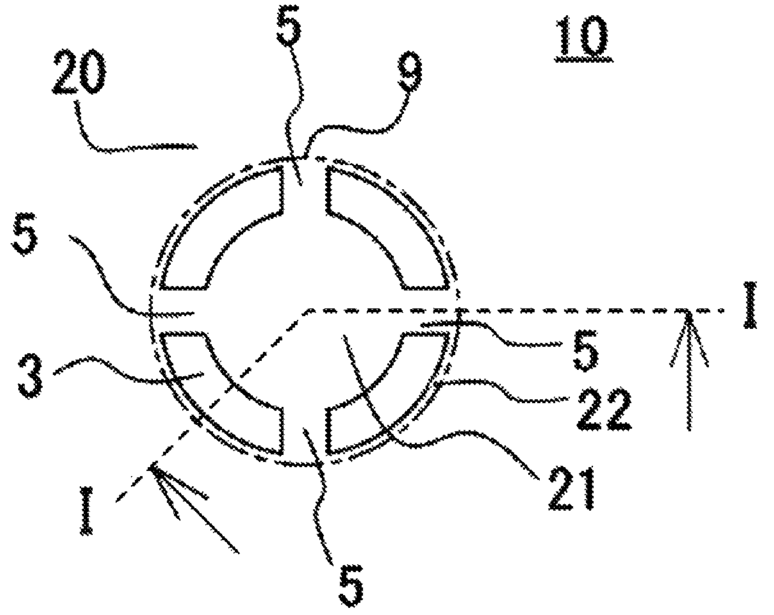

{Fig. 3}
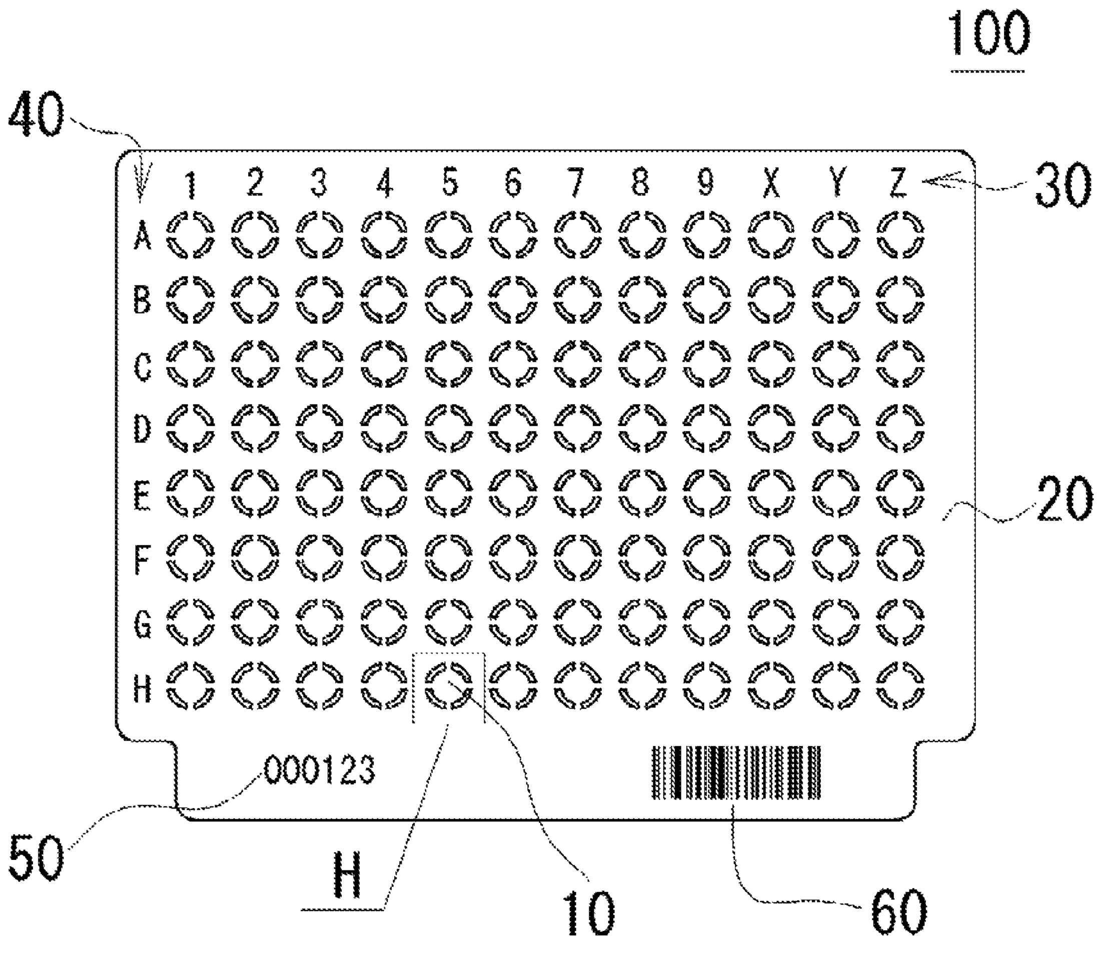

{Fig. 4A}

| NAME | REFERENCE SIGN | | MATERIAL | THICKNESS (nm) |
|---|---|---|---|---|
| OPTICAL MULTILAYER FILM | 2A | 2a | Ti | 10 |
| | | 2b | $SiO_2$ | 90 |
| | | 2c | Ti | 10 |
| | | 2d | $Al_2O_3$ | 80 |
| FIRST METAL FILM | 2M | | Ni | 300 |
| SUBSTRATE | 1 | | $Al_2O_3$ | — |

{Fig. 4B}

| NAME | REFERENCE SIGN | | MATERIAL | THICKNESS (nm) |
|---|---|---|---|---|
| OPTICAL MULTILAYER FILM | 2A | 2a | Ti | 10 |
| | | 2b | $SiO_2$ | 60 |
| | | 2c | $TiO_2$ | 30 |
| | | 2d | $Al_2O_3$ | 60 |
| FIRST METAL FILM | 2M | | Al | 300 |
| SUBSTRATE | 1 | | $Al_2O_3$ | — |

{Fig. 5}
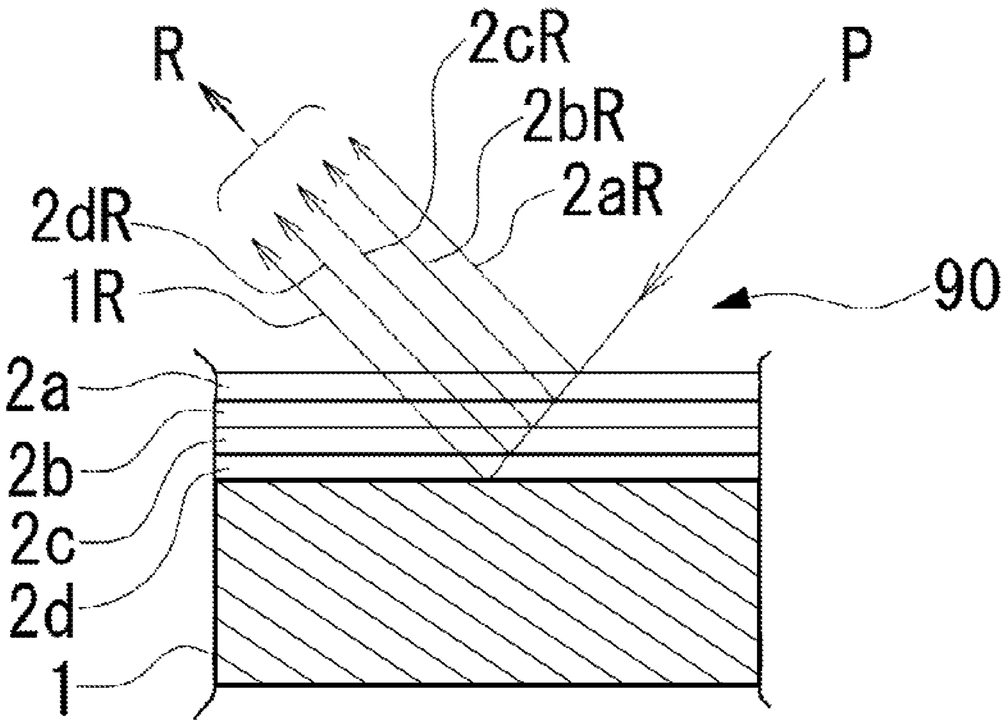
{Fig. 6}
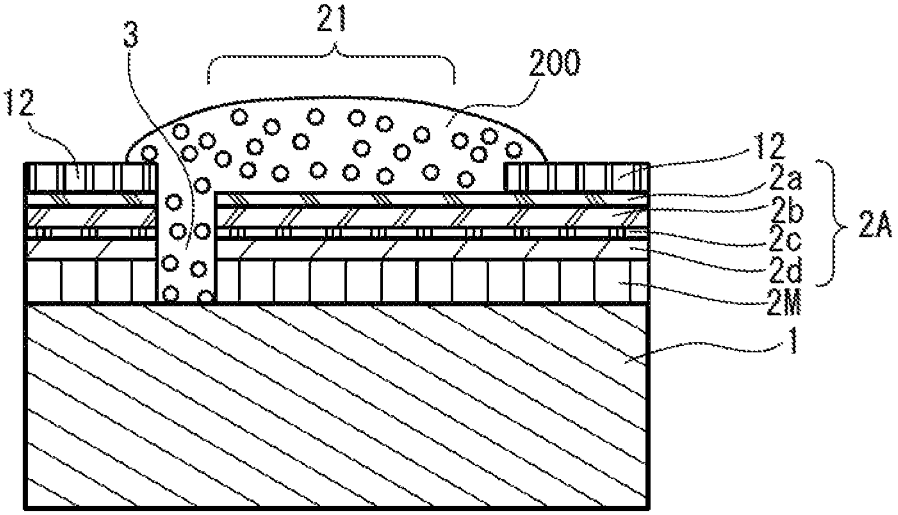

{Fig. 7}
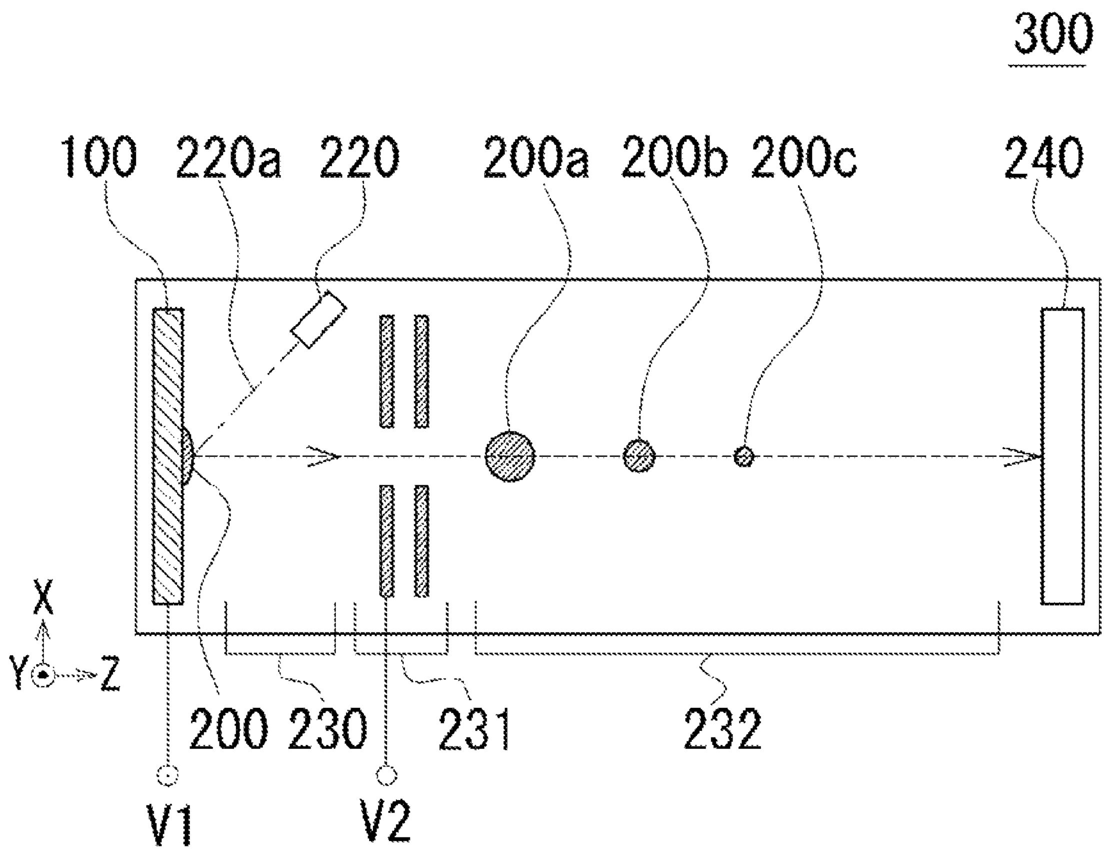

{Fig. 8}
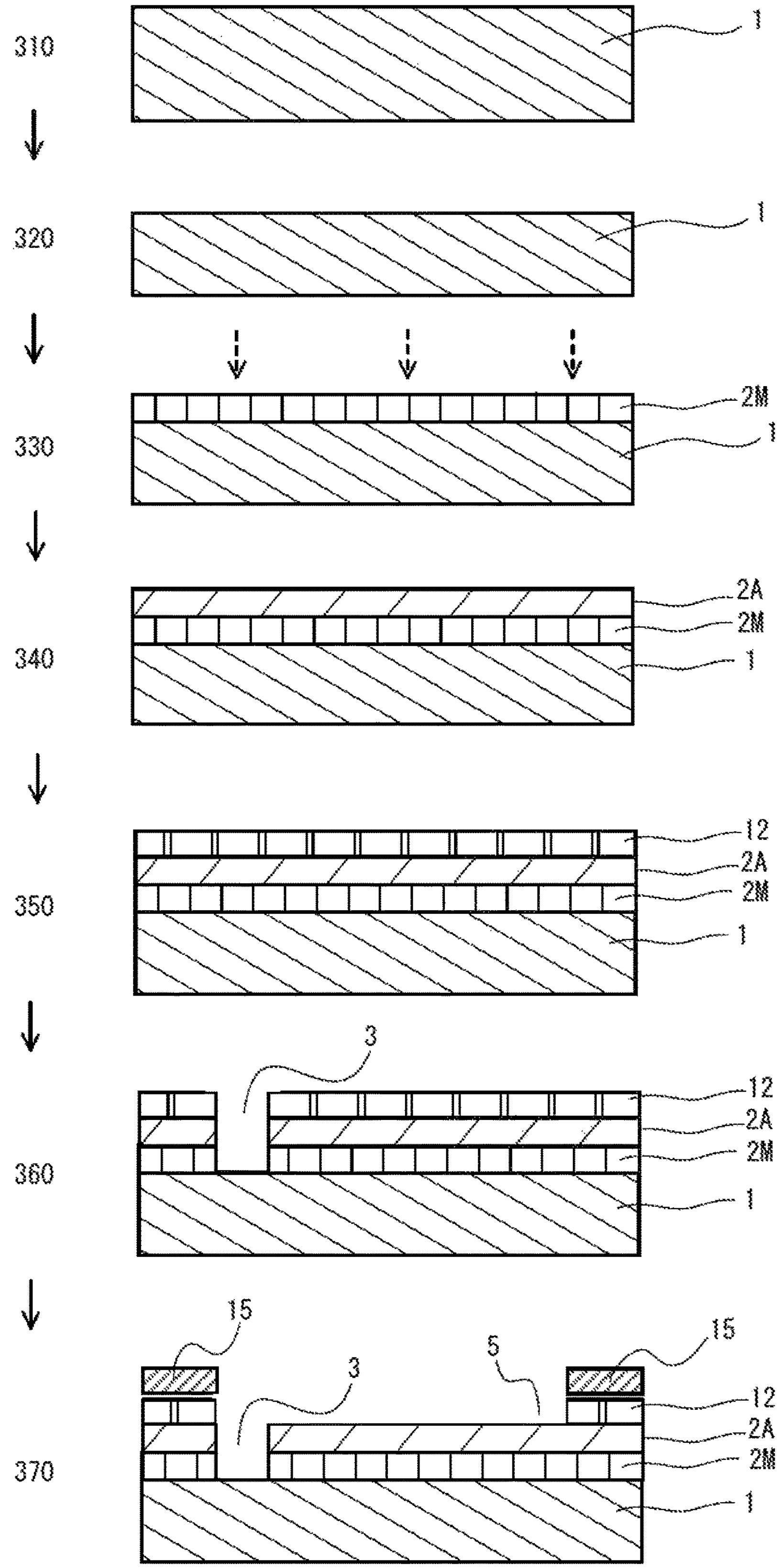

SAMPLE MOUNTING PLATE AND METHOD FOR MANUFACTURING THE SAME

TECHNICAL FIELD

The present invention relates to a sample mounting plate that mounts a sample thereon and a method for manufacturing the same.

BACKGROUND ART

As one ionization process in mass spectrometry capable of speedily and accurately diagnosing pathogenic germs and bacteria, matrix assisted laser desorption/ionization (MALDI) process is known.

The MALDI process is a process of ionizing a sample by mixing a sample in advance in a material (matrix) that is likely to absorb laser light and to be ionized and irradiating a resultant mixture with laser light, in order to analyze an analyte that is less likely to absorb laser light or is susceptible to damage by laser light.

In a mass spectrometer utilizing the MALDI process, generally, a plate made of metal (hereinafter, called a "sample mounting plate") called a target plate on which a matter obtained by mixing an analyte and a matrix in advance and liquefying the mixture by a solvent (hereinafter, the matter is called a "sample", and a matter that is liquid at the time of dripping and is dried to be crystallized is also called a "sample") is mounted is placed in the spectrometer, and the sample mounted on the sample mounting plate is irradiated with laser light for a predetermined time to be desorbed/ionized. In this event, voltage is applied to the sample mounting plate made of metal to place the desorbed/ionized sample in an electric field, thereby making the desorbed/ionized sample easily fly toward an electrode for acceleration.

The sample mounting plate has a plurality of sample mounting regions (hereinafter, called "sample mounting spots") for mounting the sample thereon, and the sample mounting plate is placed in the mass spectrometer after a plurality of samples to be measured are respectively dripped to predetermined sample mounting spots and dried (crystallized), and the plurality of samples are irradiated with laser by moving the sample mounting plate.

In the MALDI process, it is important that the crystals deposit as uniformly as possible in the sample mounting spots, the analytes are appropriately desorbed/ionized, and appropriately accelerated by placing the samples in an effective electric field produced by the voltage applied to the sample mounting plate, and many suggestions regarding these analysis techniques have been made.

Regarding improvement of crystallization of a sample at a sample mounting spot and ionization of an analyte, for example, suggestion disclosed in PTL1 is that a sample mounting spot includes a central portion having an electrically conductive surface and a margin (peripheral) portion made of a hydrophobic mask, the sample dripped onto the sample mounting spot is made to crystallize and deposit in a ring shape on the margin portion due to halo effect. The crystal ring formed at the margin portion is efficiently irradiated with laser light and thereby ionized.

Besides, suggestion disclosed in PTL2 is that a conductive interference layer is provided on a substrate having an insulation property so as to exhibit a color different from that of the substrate, a hydrophobic film is formed on a surface thereof, a groove forming a sample mounting spot is provided to expose the substrate, and the dripped sample is retained in the sample mounting spot (hereinafter, called an "anchoring effect") and crystallized and ionized.

CITATION LIST

Patent Literature

{PTL1} Japanese Unexamined Patent Application Publication (Translation of PCT Application) No. 2006-525525

{PTL2} WO 2015/019861

SUMMARY OF INVENTION

Technical Problem

However, in the conventional art disclosed in PTL1, efficient measurement is performed by irradiating the crystal ring of the sample formed on the margin portion of the sample mounting spot with laser light, but the margin portion is insulative in contrast to the central portion having an electrical conduction property and therefore is not sufficient in conductivity, so that the sample is charged up, bringing about a problem of interference with appropriate ionization. In other words, it can be said that oozing of the sample to the margin portion is not desirable.

Besides, the conventional art disclosed in PTL2 has the anchoring effect of retaining the sample in the spot by the effect of the groove and has good visibility of the sample due to the difference of the color of the substrate from that of the sample, but the dripped sample is less likely to wet and spread to the entire region in the sample mounting spot but is likely to spread along the groove of the spot into a doughnut shape. As a result, density of the sample for use in spectrometry at the central portion of the sample mounting spot becomes lower, possibly causing deterioration in spectrometry sensitivity.

The present invention has been made in consideration of the above points and its object is to enable a sample to be uniformly applied and spread in a sample mounting spot when mounting the sample on the sample mounting spot on a sample mounting plate for use in mass spectrometry by the MALDI process.

Solution to Problem

To solve the above problem, a sample mounting plate of this invention is a sample mounting plate used for mass spectrometry by MALDI process and including one or more sample mounting spots for mounting a sample thereon, on a substrate, wherein a hydrophilic surface of a first hydrophilic film is formed in the sample mounting spot on a face of the substrate where the sample mounting spots are provided, a hydrophobic surface of a hydrophobic film is formed outside the hydrophilic surface, and a boundary part of a second hydrophilic film or a hydrophilic member, which has higher hydrophilicity than that the first hydrophilic film, is formed at a boundary between the hydrophilic surface and the hydrophobic surface.

In the sample mounting plate, it is preferable that the first hydrophilic film is a metal film.

Alternatively, it is preferable that the first hydrophilic film is an optical multilayer film.

Further, in the sample mounting plate, it is preferable that the second hydrophilic film or hydrophilic member is the substrate.

Alternatively, it is preferable that the second hydrophilic film or hydrophilic member is a film formed between the substrate and the first hydrophilic film.

Alternatively, it is preferable that the second hydrophilic film or hydrophilic member is a metal film.

Further, in the sample mounting plate, it is preferable that the boundary part is formed with a connecting part which electrically connects an inner region and an outer region partitioned by the boundary part.

Further, it is preferable that a material of the substrate is ceramics.

Further, a method for manufacturing a sample mounting plate of this invention is a method for manufacturing a sample mounting plate used for mass spectrometry by MALDI process and including one or more sample mounting spots for mounting a sample thereon, on a substrate, the method including the steps of: forming a first hydrophilic film on the substrate having a surface on which a second hydrophilic film having higher hydrophilicity than the first hydrophilic film is formed or having a surface having higher hydrophilicity than that of the first hydrophilic film; forming a hydrophobic film on the first hydrophilic film; removing the hydrophobic film in a region inside the sample mounting spots to expose the first hydrophilic film; and removing the hydrophobic film and the first hydrophilic film at a boundary part between the region where the first hydrophilic film is exposed and a region where the first hydrophilic film is not exposed, to expose the second hydrophilic film or the surface of the substrate having higher hydrophilicity than that of the first hydrophilic film.

Further, another method for manufacturing a sample mounting plate of this invention is a method for manufacturing a sample mounting plate used for mass spectrometry by MALDI process and including one or more sample mounting spots for mounting a sample thereon, on a substrate, the method including: a first step of forming a first hydrophilic film on the substrate having a surface on which a second hydrophilic film having hydrophilicity than that of the first hydrophilic film is formed or having a surface having higher hydrophilicity than that of the first hydrophilic film; a second step of forming a hydrophobic film in a region except a region inside the sample mounting spots on the first hydrophilic film; and a third step of removing the first hydrophilic film at a boundary part between the region where the hydrophobic film is formed and a region where the hydrophobic film is not formed, to expose the second hydrophilic film or the surface of the substrate having higher hydrophilicity than that of the first hydrophilic film.

Advantageous Effects of Invention

According to the configuration of the invention as described above, it is possible to uniformly apply and spread a sample in a sample mounting spot when mounting the sample on the sample mounting spot on a sample mounting plate. It is also possible to manufacture the sample mounting plate having such effects.

BRIEF DESCRIPTION OF DRAWINGS

FIG. 1 is a cross-sectional view taken along a line I-I in FIG. 2.

FIG. 2 is an enlarged view of a portion indicated by a sign H in FIG. 3.

FIG. 3 is a plan view illustrating an embodiment of a sample mounting plate of the present invention.

FIG. 4A is a diagram illustrating a configuration example of a first metal film and an optical multilayer film layered in the sample mounting plate of the present invention.

FIG. 4B is a diagram illustrating another configuration example of the first metal film and the optical multilayer film layered in the sample mounting plate of the present invention.

FIG. 5 is a schematic cross-sectional view for explaining a coloring principle by interference in the optical multilayer film.

FIG. 6 is a partial cross-sectional view for explaining a state where a sample is mounted on a sample mounting spot in the present invention.

FIG. 7 is a schematic view for explaining an operation of a mass spectrometer.

FIG. 8 is a process chart for explaining a manufacturing method relating to the sample mounting plate in the embodiment of the present invention.

DESCRIPTION OF EMBODIMENTS

Hereinafter, an embodiment of the present invention will be described using FIG. 1 to FIG. 8.

A sample mounting plate is placed in a mass spectrometer utilizing MALDI process (see later-described FIG. 7), and is used for mounting a sample on a sample mounting spot and analyzing its mass. An embodiment described below for carrying out the invention is for exemplifying a sample mounting plate and a method for manufacturing the same for embodying the spirit of the present invention, and the present invention is not limited to the method and configuration described below. Particularly, as for the manufacturing method and the shapes and materials of members, their relative arrangement and so on described in the embodiment, the scope of the present invention is not limited to them unless otherwise specifically stated. Further, the sizes, shapes, and positional relation of the members and films and layers to be formed illustrated in the drawings are sometimes emphasized for easy description.

[Description of Sample Mounting Plate of an Embodiment: FIG. 1 to FIG. 4B]

First of all, configuration of a sample mounting plate being an embodiment of the present invention will be described using FIG. 3.

FIG. 3 is a plan view of the sample mounting plate viewed from the side of a face where the sample is mounted.

A substrate 1 of the sample mounting plate 100 has an insulation property and is an almost rectangular flat plate having an outer shape of about 50 mm×40 mm, and the sample mounting plate 100 can be produced using a material such as $Al_2O_3$ (alumina). Further, cutout parts are provided, for example, at a lower side for positioning or so. Further, the flatness of the sample mounting plate 100 has an accuracy of 30 μm or less. Note that the outer shape, thickness and so on are not particularly limited, but only need to match the specifications of the mass spectrometer. The sample mounting plate may be subjected to surface finish by a lapping process or a polishing process in order to ensure the flatness.

The sample mounting plate 100 is formed with a plurality of almost circular sample mounting spots 10. In this example, longitudinally eight×laterally twelve, a total of 96 sample mounting spots are provided. The number of the sample mounting spots 10 is not limited to the above but is decided in conformity to the specification of the mass spectrometer.

Next, FIG. 2 illustrates an enlarged view of an H part of the sample mounting spot 10. The sample mounting spot 10 is formed such that grooves 3 formed in a ring shape at a spot peripheral part are formed as exposed parts where the substrate is exposed to the surface. Further, the grooves 3 are not a continuous closed curve but are formed with connecting parts 5 which electrically connect an island 21 being an inner region surrounded by the grooves 3 to a margin part 20 of the sample mounting plate. As described above, the sample mounting spot 10 is a region including the grooves 3, the island 21, and the connecting parts 5, and is defined as a region including an outer peripheral part 22 (a region sandwiched between a one-dotted chain line 9 and the grooves 3). The outer peripheral part 22 is sufficiently separated from outer peripheral parts of adjacent sample mounting spots so that mounted samples will not be mixed or contaminated with one another. Further, a first hydrophilic film exists on the surface of the island 21, and a hydrophobic film is formed on the surface of the outer peripheral part 22. The grooves 3 constitute a boundary part existing at the boundary between the hydrophilic island 21 and the hydrophobic outer peripheral part 22. Since the connecting parts 5 are formed, a first metal film 2M and a metal film in an optical multilayer film are films continuous from the island 21 to the outer peripheral part 22 and further to the margin part 20 of the sample mounting plate to electrically ensure conductivity.

Note that column address marks 30 (for example, 1 to 9 and X to Z) and row address marks 40 (for example, A to H) which indicate positions of the sample mounting spots 10, and a serial number 50, a bar code 60 and so on for managing the sample mounting plate, can be formed on the sample mounting plate 100. These address marks, serial number, bar code and so on are not limited to the above but may be added and deleted as necessary. Further, the shapes of the grooves 3 and the connecting parts 5 forming the sample mounting spot 10 are made to be four positions at every 90 degrees. However, it is not limited to that. One or a plurality of connecting parts may be formed. Here, the methods for forming the sample mounting spot, address marks, serial number, and bar code are not particularly limited, but a processing method by laser marking is preferable.

Next, the cross-sectional configuration of the sample mounting plate 100 will be described using FIG. 1. FIG. 1 is a cross sectional view taken along a section line I-I passing through the center of the sample mounting spot 10 illustrated in FIG. 2. Here, the first metal film 2M is formed first on the surface on one side of the substrate 1. Next, an optical multilayer film 2A is formed to be layered on the first metal film 2M. The optical multilayer film 2A is composed of a dielectric film or a second metal film, and not particularly limited in kinds of films and in the number of layers, and the optical multilayer film 2A has, for example, 2*d*, 2*c*, 2*b*, 2*a* formed in this order. Further, a hydrophobic film 12 is formed on the optical multilayer film. The first metal film 2M and the optical multilayer film 2A are formed by a film formation method such as vacuum deposition, sputtering or the like. The hydrophobic film 12 is also formed by a film formation method such as vacuum deposition, sputtering or the like, but can also be formed by a method such as dip coating or the like of forming a film by immersion in liquid and slowly pulling it up.

Further, in the sample mounting spot 10, the surface of the substrate 1 is exposed by the grooves 3 penetrating the hydrophobic film 12, the first metal film 2M, and the optical multilayer film 2A as described above. Here, the substrate 1 exposed by the grooves 3 constitutes a hydrophilic member, since the substrate 1 is made of a material having high hydrophilicity such as $Al_2O_3$, and thereby enhancing anchoring effect of retaining the sample inside the spot when a liquid sample is dripped to the sample mounting spot 10 (see later-described FIG. 6). Further, at the cross section of the position of the connecting part 5, the first metal film 2M and the optical multilayer film 2A couple the island 21 and the outer peripheral part 22 without cutting them. This electrically conducts the island 21 and the outer peripheral part 22.

The grooves 3 are formed to expose the surface of the substrate 1 in this embodiment, but not limited to this. The grooves 3 can be formed to penetrate only the optical multilayer film 2A and expose the surface of the first metal film 2M. Furthermore, a middle layer of the optical multilayer film can be exposed, and the exposed surface only needs to be most hydrophilic among the faces exposed to the mounting surface, on which the sample is mounted, of the sample mounting plate 100. In other words, the exposed surface only needs to have higher hydrophilicity than the surface of the optical multilayer film 2A being a first hydrophilic film constituting the island 21. In this case, the exposed surface corresponds to a second hydrophilic film. The method for forming the grooves being the boundary part may be a method by laser marking, and a method by etching using photolithography is also preferable when forming the grooves leaving a part of the optical multilayer film or the first metal film, and the forming method is not limited to them.

Next, two examples of the films and substrate cross-sectional configuration of the sample mounting plate 100 will be described using FIG. 4A and FIG. 4B.

Example 1

FIG. 4A illustrates Example 1 of the cross-sectional configuration of the sample mounting plate 100. The cross-sectional configuration illustrated in FIG. 4A uses $Al_2O_3$ for the substrate 1. The first metal film 2M layered on the substrate 1 is made of Ni as a material and has a film thickness of about 300 nm (1 nm=0.000001 mm). Next, a first layer 2*d* constituting the optical multilayer film 2A is made of $Al_2O_3$ and has a film thickness of about 80 nm. A second layer 2*c* is made of Ti and has a film thickness of about 10 nm. A third layer 2*b* is made of $SiO_2$ and has a film thickness of about 90 nm. A fourth layer 2*a* is made of Ti and has a film thickness of about 10 nm. The above configuration can make the surface of the sample mounting plate 100 exhibit navy blue in a wavelength region of visible light. On the optical multilayer film 2A, the hydrophobic film 12 composed of C (carbon), F (fluorine), Si (silicon) or the like is formed. However, the hydrophobic film 12 has a film thickness of, for example, as small as about 2 to 3 nm, and thus less affects the conductivity and color of the surface inside the sample mounting spot 10.

Example 2

FIG. 4B illustrates Example 2 of the cross-sectional configuration of the sample mounting plate 100. The cross-sectional configuration illustrated in FIG. 4B uses $Al_2O_3$ for the substrate 1. The first metal film 2M layered on the substrate 1 is made of Al as a material and has a film thickness of about 300 nm. Next, a first layer 2*d* constituting the optical multilayer film 2A is made of $Al_2O_3$ and has a film thickness of about 60 nm. A second layer 2*c* is made of $TiO_2$ and has a film thickness of about 30 nm. A third layer 2*b* is made of $SiO_2$ and has a film thickness of about 60 nm. A fourth layer 2*a* is made of Ti and has a film thickness of about 10 nm. The above film configuration can make the surface of the sample mounting plate 100 exhibit blue in a wavelength region of visible light. On the optical multilayer film 2A, the hydrophobic film 12 is formed as in Example 1.

As illustrated in Example 1 and Example 2, a suitable combination of the first metal film and the optical multilayer film 2A formed to be layered on the substrate 1 can achieve arbitrary reflection characteristics (coloring) utilizing the optical interference. Note that the optical multilayer film 2A may include not only the dielectric film as illustrated in FIG. 4A and FIG. 4B, but also a metal film mixed therein.

Further, also in the case where the portion exposed by the groove 3 is the first metal film located on the substrate, the first metal film is gray close to white, and therefore the sample mounting spot 10 is good in visibility due to the contrast with the optical multilayer film 2A.

Furthermore, use of a white material for the substrate 1 makes the contrast between the surface color of the sample mounting plate and the optical multilayer film 2A more conspicuous because the color of the exposed substrate is white in the case where the substrate 1 is exposed by the groove 3, thus making the sample mounting spot 10 better in visibility. Further, the crystals of the sample exhibit white color and thus can allow discrimination between colors of the sample mounting plate surface and the optical multilayer film 2A, enabling confirmation of the presence or absence of mounting after crystallization.

As for the hydrophilicity, the faces exposed at respective portions are selected and constituted so that the groove 3 being the boundary part has highest hydrophilicity, the surface of the island 21 has next higher hydrophilicity, and the outer peripheral part 22 has a hydrophobic face. In other words, the above condition can be achieved when, for example, the substrate 1 is made of alumina as a material and the substrate 1 is exposed at the groove 3 and the fourth layer 2*a* of the optical multilayer film 2A is exposed at the island 21 so that the hydrophilicity of the face exposed at the groove 3 becomes higher than the hydrophilicity of the island 21.

[Description Related to Coloring and Visibility of Sample Mounting Plate: FIG. 5]

Next, the coloring of the sample mounting plate will be described using FIG. 5. FIG. 5 is a schematic view for describing the interference of light when the optical multilayer film is formed on the substrate.

In FIG. 5, on the substrate 1, for example, the dielectric films 2*a*, 2*b*, 2*c*, 2*d* are formed to be layered as the optical multilayer film for description. Though arbitrary reflection characteristics (coloring) can be obtained by adjusting the material (refractive index) and thickness of each layer, and the number of layers, only a principle description will be made here using the schematic view. (It is generally supposed that a dielectric film having a high refractive index and a dielectric film having a low refractive index as a pair are alternately layered in a thickness of ¼ wavelength, thereby additively overlapping reflected waves from the interfaces of the layers due to the interference of light to achieve the reflection function with high efficiency).

Incident light P incident on the optical multilayer film from an air layer 90 first generates a reflected wave 2*a*R at the interface between the air and the dielectric film 2*a*. Similarly, reflected waves 2*b*R, 2*c*R, 2*d*R. 1R are generated at the interfaces between the layers respectively. The reflections from the interfaces are added together into a reflected wave R. The reflected wave R having arbitrary reflection characteristics (coloring) can be obtained by changing the materials (refractive indexes) and film thicknesses of each film layer, and the number of film layers. Note that by providing a metal film in the dielectric film, various reflection characteristics can be achieved. Metal films are used for the intermediate layer 2*c* and the uppermost layer 2*a* in above described Example 1, whereas a metal film is used for the uppermost layer 2*a* in Example 2.

As a result of selecting concrete film materials and film thicknesses as illustrated in FIG. 4A based on the principle, the reflection characteristics of the sample mounting plate 100 in Example 1 are that the reflectance as a whole is rather low in a wavelength region W (about 380 nm to about 780 nm) of the visible light but there is a peak of reflecting rather much light on a side of short wavelength, namely, navy blue light, resulting in that the surface of the plate appears in navy blue color.

The reflection characteristics of the sample mounting plate 100 in Example 2 are similar to the characteristics exhibited in Example 1 but slightly different in that it appears in blue color.

[Description of Spectrometry Operation by Mass Spectrometer: FIG. 6, FIG. 7]

Next, the operation of performing mass spectrometry of the sample will be described using FIG. 6, FIG. 7. Here, the sample mounting plate and a portion relating to ionization of the sample will be mainly described, and only a principle description for the others will be made with details omitted. FIG. 6 is a schematic view illustrating a state where a sample 200 is mounted on the above-described sample mounting plate 100, and FIG. 7 is a schematic view illustrating a state where the sample mounting plate on which the sample 200 is mounted is placed in a MALDI mass spectrometer 300.

FIG. 6 illustrates a cross-section of a state where the sample 200 made by mixing an analyte and a matrix and liquefying the mixture by a solvent is dripped to the sample mounting spot, and then evaporated and dried up. A predetermined amount of the sample 200 is dripped to an island 21 (see FIG. 1, FIG. 3) of the sample mounting spot 10 by a not-illustrated instrument. The dripped sample 200 tends to radially spread because of the gravity and the surface tension. The sample 200 enters the groove 3 while radially spreading, and reaches the surface (exposed face) of the substrate 1. Since the substrate 1 made of ceramics having high hydrophilicity, the reached sample 200 wetly remains on the surface of the substrate 1 and is held by the substrate 1 (anchoring effect).

Then, after completion of the mounting of the sample 200 to be analyzed, each sample 200 is dried up in that state. In this event, the sample mounting spot 10 on the sample mounting plate 100 exhibits strong anchoring effect for retaining the sample 200 in the spot and is therefore less likely to cause movement of the sample 200 even if it is vibrated, thus enabling stable holding at dripping to facilitate work.

Next, FIG. 7 illustrates a schematic view of the MALDI mass spectrometer 300 in which the sample mounting plate 100 with the sample 200 mounted thereon is placed in the MALDI mass spectrometer 300 and fixed by a not-illustrated fixing unit. Though the MALDI mass spectrometer has a mechanism in which the samples 200 mounted on a plurality of spots can move in an X-direction and a Y-direction and the samples can stop at a predetermined position, one sample mounting spot will be described here for simplification.

In the MALDI mass spectrometer 300 illustrated in FIG. 7, the sample mounting plate 100 is placed on the left side and is detachably fixed by a not-illustrated clamp unit. Further, conduction can be performed from a not-illustrated voltage application unit to the sample mounting plate 100. The MALDI mass spectrometer 300 further includes a laser light source 220 which irradiates the sample 200 with laser light 220*a*, an ion accelerator 230 which accelerates analytes (200*a*, 200*b*, 200*c*) having been separated from the sample 200 because of the irradiation of the laser light and having been ionized, an ion trap 231 which traps ions, a mass separator 232 which forms a flight space for ions and carries out mass separation of the ions, and an ion detector 240 which detects the mass-separated and reached ions on a time series basis.

Here, the polarity of the ion of the analyte is assumed to be positive (positive charge). Upon start of the mass spectrometry, the laser light 220*a* is emitted from the laser light source 220 to the sample 200 being a measuring object for a predetermined time. Concurrently, a positive voltage V1 is applied from the not-illustrated voltage application unit to the first metal film 2M and a metal film (2*a*, 2*c* in Example 1, and 2*a* in Example 2) in the optical multilayer film of the sample mounting plate 100 to thereby effectively apply a positive voltage to the sample 200. Concurrently, a negative voltage V2 is applied to a first grid of the ion trap 231.

In this event, the matrix included in the sample 200 evaporates together with an analyte, whereby the analyte desorbs and is ionized. Then, the positive voltage V1 is applied to the analyte, and an electric field in a downward gradient is generated toward the ion trap 231 to which the negative voltage V2 is applied, so that the desorbed and ionized analyte is accelerated in the ion accelerator 230 toward the ion trap 231. Thus, the desorbed and ionized analyte is sent into the mass separator (flight space) 232 through the ion trap 231, and reaches the ion detector in the order of 200*c*, 200*b*, 200*a* because they are separated during flight depending on difference in mass and thus time difference occurs. The data detected by the ion detector 240 is then analyzed by a not-illustrated analyzer and subjected to mass spectrometry regarding the analyte. As a result of this, the identification of the sample is speedily and accurately performed.

Effect of Embodiment

As described above, according to the embodiment, the following effects can be achieved.

When mounting a sample on the sample mounting spot 10, first, the sample 200 is attracted by the grooves 3 having highest hydrophilicity and wetly spreads along the grooves 3. Then, since the vicinity of the center of the inside surrounded by the grooves 3, namely, the island 21 is the hydrophilic surface, the sample 200 wetly spreads toward the island 21, resulting in that the sample can be surely trapped in the grooves 3 and on the hydrophilic surface of the island 21 of the sample mounting spot 10. Further, also in the case where the sample is not dripped to the center of the sample mounting spot when mounting the sample on the sample mounting spot 10, the sample wetly spreads along the grooves 3 having highest hydrophilicity on the surface of the sample mounting plate 100, the sample subsequently wetly spreads to the center of the hydrophilic sample mounting spot and crystallizes, resulting in that the analysis utilizing the MALDI spectrometry process can be surely performed.

In other words, when mounting the sample on the sample mounting spot, first, the sample is attracted by the boundary part having highest hydrophilicity among the faces exposed on the substrate surface and wetly spreads along the boundary part, then wetly spreads toward the vicinity of the center inside the sample mounting spot because the vicinity of the center of the inside surrounded by the boundary part is the hydrophilic surface, resulting in that the sample can be surely trapped by the boundary part of the sample mounting spot and on the hydrophilic surface inside the boundary part. Further, also in the case where the sample is not dripped to the center of the sample mounting spot when mounting the sample on the sample mounting spot, the sample first wetly spreads along the boundary part having highest hydrophilicity of the face exposed on the substrate surface, and the sample subsequently wetly spreads to the hydrophilic center of the sample mounting spot having high hydrophilicity and crystallizes, resulting in that the analysis utilizing the MALDI spectrometry process can be surely performed.

Further, since the metal film being the first hydrophilic film and the metal film being the second hydrophilic film are not electrically cut between the inner region and the outside region partitioned by the boundary part of the sample mounting spot because the connecting part is provided, the voltage applied via the margin part of the sample mounting plate can be surely conducted to the sample existing in the sample mounting spot through the metal film being the first hydrophilic film and the metal film being the second hydrophilic film in the mass spectrometry by the MALDI process.

In short, since the connecting part is provided, the voltage applied via the margin part of the sample mounting plate can be surely conducted to the sample existing in the sample mounting spot by the metal film being the first hydrophilic film and the metal film being the second hydrophilic film in the mass spectrometry by the MALDI process.

Use of the material having high hydrophilicity such as ceramics for the substrate can enhance the anchoring effect of the sample in the sample mounting spot. As a result of this, it becomes possible to improve the accuracy of the dripping position of the sample and improve the efficiency of the dripping work. Further, the variation in acceleration distance where the ionized sample is accelerated in the electric field is small because of high flatness of the substrate, thus enabling mass spectrometry high in measurement accuracy.

Further, the first metal film 2M and the optical multilayer film 2A layered on the substrate can produce an arbitrary color. As a result of this, visibility of samples to be mounted can be increased, thereby improving the dripping work of the samples. Further, since the visibility of the sample mounting spot can be further increased by the formed sample mounting spot and the grooves inside the sample mounting spot, thereby facilitating the work management for the samples. Further, it is conceivable to create sample mounting plates in various colors and color-code them, thereby facilitating storage and management of samples.

More specifically, in the case where the first hydrophilic film is the optical multilayer film, the reflectance of light can be adjusted to make a difference from the color of the boundary part, thereby making it possible to concurrently achieve the good visibility and the above effect. Further, the crystals of the sample exhibit a white color, thus enabling discrimination in color from the sample mounting plate, thus making it possible to confirm the presence or absence of mounting after crystallization.

Note that the examples where $Al_2O_3$ being ceramics is used for the substrate is described as the Examples, but not limited to this. Other ceramic materials such as a composite material of porcelain and ceramics, glass, Si, and plastic may be used. Further, the examples where Ni, Ti, or Al is used as the first metal film 2M and the metal films in the optical multilayer film 2A is described, but not limited to this. Other metals such as chromium and gold may be used. Further, the examples where $Al_2O_3$, $SiO_2$, or $TiO_2$ is used as the material of the dielectric film is described, but not limited to this. Other dielectric materials such as MgO, $MgF_2$, and $ZrO_2$ may be used.

Though the first metal film 2M, the optical multilayer film 2A, and the hydrophobic film 12 are formed on the substrate 1 in this embodiment, another hydrophilic film or the like may be formed on the surface of the substrate 1, with which an increase in effect of visibility or the like is expected.

Further, though the metal film and the optical multilayer film are formed only on the surface on one side of the substrate in this embodiment, it is more convenient that the metal film and the optical multilayer film are formed on the surfaces on both sides of the substrate in some cases depending on the method for forming the films. Therefore, the metal film and the optical multilayer film may be formed on the surfaces on both sides of the substrate. Alternately, on the surface on the side where the sample is not mounted, one of the metal film and the optical multilayer film may be formed, or moreover partially formed in the plane.

[Description of Method for Manufacturing Sample Mounting Plate 100: FIG. 8]

Next, a method for manufacturing the sample mounting plate 100 in this embodiment will be described using FIG. 8. FIG. 8 is a process chart illustrating the method for manufacturing the sample mounting plate 100.

[Description of Manufacturing Method: FIG. 8]

Description will be made while illustrating main processes of 310 to 370 of the method for manufacturing the sample mounting plate 100 in FIG. 8. Note that general works such as transfer, inspection, cleaning, drying, annealing and so on necessary for each process are naturally performed unless otherwise specifically stated in each process, and description thereof will be omitted.

[Substrate Receiving Process: 310]

First, in a substrate receiving process 310, the flatness and the surface roughness of the substrate 1 are inspected to confirm that the substrate 1 has predetermined flatness and surface roughness.

[Substrate Surface Processing Process (Enlarged View): 320]

Next, in a substrate surface processing process 320, a lapping process or a polishing process are performed on the substrate 1 to shape the substrate 1 into predetermined substrate thickness, surface roughness, and flatness. Note that main inspection items in this process are the surface roughness and the flatness of the substrate.

[First Metal Film Forming Process (Enlarged View): 330]

Next, in a first metal film forming process 330, the first metal film 2M is formed. For example, Ni is formed in a thickness of 300 nm using a deposition method such as vacuum deposition or sputtering. In this event, the irradiation direction of deposition particles is desirably a vertical direction in order to make a uniform film as much as possible (see the broken arrows).

[Optical Multilayer Film Forming Process (Enlarged View): 340]

Next, in an optical multilayer film forming process 340, the optical multilayer film 2A is formed to be layered. For example, the layer 2_d_, the layer 2_c_, the layer 2_b_, and the layer 2_a_ in FIG. 4A or FIG. 4B are formed in order by a deposition method such as vacuum deposition or sputtering.

[Hydrophobic Film Forming Process: 350]

Next, in a hydrophobic film forming process 350, the hydrophobic film 12 is formed to be layered on the surface of the optical multilayer film 2A formed in the preceding process. For example, a water-repellent agent containing C (carbon) or F (fluorine) or Si (silicon), or a water-repellent agent made by compounding them is formed into, for example, a thickness of 2 nm by a deposition method such as vacuum deposition.

[Groove Forming Process: 360]

Next, in a groove forming process 360, the groove 3 which forms the sample mounting spot 10 is formed. For example, a peeling process is performed by a processing method such as laser marking method, on the film layers to penetrate the hydrophobic film 12, the optical multilayer film 2A, and the first metal film 2M until the surface of the substrate 1 is exposed. Further, it is desirable to simultaneously form the other address mark, bar code and so on.

[Hydrophobic Film Removing Process: 370]

Finally, in a hydrophobic film removing process 370, the hydrophobic film 12 formed in the island 21 of the sample mounting spot 10 is peeled. For example, a mask 15 (its detailed description will be omitted) is formed outside the sample mounting spots 10 and the hydrophobic film 12 is peeled by the processing method such as plasma etching. The mask 15 opens in a region inside the outer diameter of the grooves 3 including the islands 21 and has a function of protecting the outside of the opened region from plasma.

The manufacturing method described above can provide a method for manufacturing a sample mounting plate having a desired reflected color by the optical multilayer film on the surface of the substrate. Further, it is possible to provide a method for manufacturing a sample mounting plate excellent in visibility of a sample and exhibiting strong anchoring effect for a dripping sample.

As another method, in the hydrophobic film forming process 350, the hydrophobic film forming process 350 can be implemented in a state where a mask having a size covering the region inside the outer diameter of the grooves 3 including the islands 21 of the sample mounting spots is put on the positions of the sample mounting spots 10 from above. In this case, the hydrophobic film removing process 370 becomes unnecessary. As the mask, a stencil mask in which masking portions existing in respective sample mounting spots are connected one another by thin bridges, is preferable.

The embodiments of the sample mounting plate and the method for manufacturing the same have been described in detail in the above, but the present invention is not limited to the embodiments and the manufacturing method, and the configurations of details, materials and numbers can be arbitrarily modified, added, deleted without departing from the spirit of the present invention. In other words, modifications and omissions may be made within the scope of the contents as set forth in claims of the above-described sample mounting plate and the manufacturing method. For example, the order of the groove forming process 360 and the hydrophobic film removing process 370 may be interchanged.

REFERENCE SIGNS LIST

1 . . . substrate
2A . . . optical multilayer film
2M . . . first metal film (exposed portion of first metal film)
2_a_, 2_b_, 2_c_, 2_d_ . . . dielectric film or second metal film

3 . . . groove (boundary part)
5 . . . connecting part
10 . . . sample mounting spot
12 . . . hydrophobic film
15 . . . mask
20 . . . margin part of sample mounting plate
21 . . . island (of sample mounting spot)
22 . . . outer peripheral part (of sample mounting spot)
30 . . . column address mark
40 . . . row address mark
50 . . . serial number
60 . . . bar code
100 . . . sample mounting plate
200 . . . sample
200*a*, 200*b*, 200*c* . . . ionized sample
220 . . . laser light source
220*a* . . . laser light
230 . . . ion accelerator
231 . . . ion trap
232 . . . mass separator (flight space)
240 . . . ion detector
300 . . . MALDI mass spectrometer

The invention claimed is:

1. A sample mounting plate used for mass spectrometry by MALDI process and comprising one or more sample mounting spots for mounting a sample thereon, on a substrate, wherein a hydrophilic surface of a first hydrophilic film is formed in the sample mounting spots on a face of the substrate where the sample mounting spots are provided, a hydrophobic surface of a hydrophobic film extends around the hydrophilic surface as seen in a plan view of the sample mounting plate, and a boundary part formed of a second hydrophilic film or a hydrophilic member, which has higher hydrophilicity than that of the hydrophilic surface, is formed between the hydrophilic surface and the hydrophobic surface as seen in the plan view of the face of the sample mounting plate.

2. The sample mounting plate according to claim 1, wherein the first hydrophilic film is a metal film.

3. The sample mounting plate according to claim 1, wherein the first hydrophilic film is an optical multilayer film.

4. The sample mounting plate according to claim 1, wherein the second hydrophilic film or hydrophilic member is the substrate.

5. The sample mounting plate according to claim 1, wherein the second hydrophilic film or hydrophilic member is a film formed between the substrate and the first hydrophilic film.

6. The sample mounting plate according to claim 5, wherein the second hydrophilic film or hydrophilic member is a metal film.

7. The sample mounting plate according to claim 1, wherein the boundary part is formed with a connecting part which electrically connects an inner region and an outer region partitioned by the boundary part as seen in the plan view of the face of the sample mounting plate.

8. The sample mounting plate according to claim 1, wherein a material of the substrate is ceramics.

9. The sample mounting plate according to claim 1, wherein the hydrophilic surface, the hydrophobic surface and the boundary part are exposed on a surface of the sample mounting plate.

10. A method for manufacturing a sample mounting plate used for mass spectrometry by MALDI process and comprising one or more sample mounting spots for mounting a sample thereon, on a substrate, the method comprising steps of:

forming a first hydrophilic film on the substrate having a surface on which a second hydrophilic film having higher hydrophilicity than that of the first hydrophilic film is formed or having a surface having hydrophilicity than that of the first hydrophilic film;

forming a hydrophobic film on the first hydrophilic film;

removing the hydrophobic film in a region inside the sample mounting spots to expose the first hydrophilic film; and removing the hydrophobic film and the first hydrophilic film at a boundary part between the region where the first hydrophilic film is exposed and a region where the first hydrophilic film is not exposed as seen in a plan view of a face of the sample mounting plate, to expose the second hydrophilic film or the surface of the substrate having higher hydrophilicity than that of the first hydrophilic film.

11. A method for manufacturing a sample mounting plate used for mass spectrometry by MALDI process and comprising one or more sample mounting spots for mounting a sample thereon, on a substrate, the method comprising:

a first step of forming a first hydrophilic film on the substrate having a surface on which a second hydrophilic film having higher hydrophilicity than that of the first hydrophilic film is formed or having a surface having higher hydrophilicity than that of the first hydrophilic film;

a second step of forming a hydrophobic film in a region except a region inside the sample mounting spots on the first hydrophilic film; and a third step of removing the first hydrophilic film at a boundary part between the region where the hydrophobic film is formed and a region where the hydrophobic film is not formed as seen in a plan view of a face of the sample mounting plate, to expose the second hydrophilic film or the surface of the substrate having higher hydrophilicity than that of the first hydrophilic film.

* * * * *